United States Patent Office 2,718,512
Patented Sept. 20, 1955

2,718,512

SILOXANE ELASTOMERS CONTAINING ZINC OXIDE OR ZINC PEROXIDE AND SILICA

Earl L. Warrick, Pittsburgh, Pa., assignor to Dow Corning Corporation, Midland, Mich., a corporation of Michigan No Drawing. Application February 23, 1952, Serial No. 273,137

5 Claims. (Cl. 260—37)

This invention relates to siloxane elastomers.

This invention is a continuation-in-part of the applicant's copending application Serial No. 156,941, filed April 19, 1950, now abandoned.

The commercial utility of siloxane elastomers has been well established. These materials are characterized by chemical inertness and unique thermal stability. One of the problems which has confronted the manufacturers of siloxane rubbers is the relatively high compression set which they exhibit. The compression set may be reduced by increasing the temperature and/or time of curing but this treatment also reduces the per cent elongation of the rubber. For some applications, low elongation is not objectionable but in others a combination of high tensile strength and high elongation with low compression set is required. For example, there is need for a siloxane rubber having an efficiency of above 150 in combination with a low compression set. The efficiency of a rubber is the product of the tensile strength in p. s. i. times the per cent elongation at break divided by 1000.

It is an object of this invention to produce siloxane elastomers having low compression set and high efficiencies. Another object is to provide an additive which reduces compression set in siloxane elastomers. Other objects and advantages will be apparent from the following description.

This invention relates to elastomeric materials composed of a polymeric organosiloxane having from 1.9 to 2 organic radicals per silicon atom, a filler and from $\frac{1}{16}$ to 10 parts by weight zinc peroxide or zinc oxide based upon the weight of the siloxane.

The applicant has found that the addition of zinc peroxide and zinc oxide reduces the compression set both in conventional siloxane elastomers such as those disclosed in U. S. Patent 2,460,795 and in the special high efficiency elastomers disclosed in the applicant's copending application, Serial No. 86,110, filed April 7, 1949, now Patent No. 2,541,137, and assigned to the assignee of this invention. The additives are of special value in connection with these high efficiency rubbers because it reduces their compression set by as much as 60 per cent without appreciably reducing the elongation.

The elastomers of this invention are prepared in the conventional manner for making siloxane elastomers, namely that of compounding the siloxane polymer with a filler and zinc peroxide or zinc oxide and if desired a vulcanizing agent and thereafter curing the material at an elevated temperature. The effect of the additives of this invention is not contingent upon the presence of nor the type of vulcanization catalyst. Elastomers having low compression set are obtained by curing a mixture of the siloxane, a filler and zinc peroxide at 250° C. for 24 hours. However, the use of a vulcanization catalyst such as bonzoyl peroxide, tertiary butyl perbenzoate, p-chlorobenzoyl peroxide, and tertiary butyl peracetate reduces the time of curing from several hours to 10 minutes or less. Thus, the incorporation of from ½ to 8 parts by weight of the vulcanization catalysts is preferred for commercial use. Tertiary butyl peracetate is disclosed in the applicant's copending application, Serial No. 126,681, filed November 10, 1949.

The organopolysiloxanes employed herein are those in which the organic radicals are alkyl, phenyl and siliconeopentyl radicals [(CH$_3$)$_3$SiCH$_2$—]. Preferably at least 50 per cent of the total organic groups are alkyl. Examples of siloxanes which are within the scope of this invention are dimethylsiloxane, diethylsiloxane, phenylmethylsiloxane, phenylethylsiloxane, siliconeopentylmethylsiloxane and copolymers of the above. In addition, the siloxanes may contain limited amounts of diphenylsiloxane, bis-siliconeopentylsiloxane and siliconeopentylphenylsiloxane together with siloxane units of the type R$_3$SiO$_{1/2}$ and RSiO$_{3/2}$ where R is any of the above radicals.

The siloxane polymers employed herein range in physical state from fluid materials having viscosities of at least 5000 cs. at 25° C. through non-flowing benzene soluble polymers to benzene insoluble tough gums. Any of the above type polymers will produce low compression set elastomers in accordance herewith.

The fillers employed in the materials of this invention are those normally employed in siloxane elastomers such as metal oxides like TiO$_2$, and Fe$_2$O$_3$, and silica fillers like diatomaceous earth, silica aerogels and fume silicas and other materials such as clay, calcium carbonate and carbon black. Preferably, the amount of filler ranges from 10 to 300 parts by weight based upon 100 parts of the siloxane.

The zinc compounds are incorporated in the compounded material in amounts ranging from $\frac{1}{16}$ to 10 parts by weight based upon 100 parts by weight siloxane. It has been found that, when employed in amounts below $\frac{1}{16}$ part by weight the additive does not significantly decrease the compression set. When the additives are employed in amounts above 10 parts by weight based on the weight of the siloxane, the improvements of this invention are not realized. The preferred range is $\frac{1}{16}$ to 5 parts by weight of the additives.

In all cases, the per cent compression set shown below was obtained by subjecting the materials to compression for 22 hours at 150° C. in accordance with ASTM–D–395–47T method B.

The following examples are illustrative only:

*Example 1*

100 parts of a benzene soluble copolymeric siloxane having the composition 90 mol per cent dimethylsiloxane and 10 mol per cent siliconeopentylmethylsiloxane.

and a penetrometer reading of less than 380 in 10 seconds according to ASTM–D–217–44T, was compounded with 25 parts of a fume silica, 4 parts tertiary butyl perbenzoate and 1 part ZnO$_2$. The material was heated in a mold for 10 minutes at 150° C. and then cured 24 hours at 250° C. The resulting elastomer had a tensile strength of 390 p. s. i., and elongation at break of 458 per cent and a compression set of 79 per cent. A control sample containing no ZnO$_2$ had a compression set of 98 per cent.

*Example 2*

100 parts of a solid benzene soluble dimethylsiloxane polymer was compounded with 25 parts of a fume silica, 4 parts tertiary butyl perbenzoate and 1 part ZnO$_2$. The material was vulcanized by heating 10 minutes at 150° C. and thereafter cured 24 hours at 250° C. The resulting elastomer had a compression set of 52 per cent as compared with 90 per cent compression set for a sample containing no ZnO$_2$.

Example 3

Cyclic dimethylsiloxane tetramer was polymerized by heating with aqueous KOH at a temperature of 180° C. until a benzene insoluble gum was obtained. The polymer was milled with 90 parts diatomaceous earth and with benzoyl peroxide and zinc peroxide as shown in the table below. In each case the compounded material was vulcanized by heating 10 minutes at 150° C. and then cured 24 hours at 250° C. For comparison a run containing no zinc peroxide is included.

| Parts by wt. Benzoyl Peroxide | Parts by wt. $ZnO_2$ | Tensile in p. s. i. | Percent Elongation at break | Percent Compression set |
|---|---|---|---|---|
| 3 | 0 | 630 | 91 | 69 |
| 2 | 1 | 575 | 92 | 37 |
| 2.5 | 1/2 | 554 | 83 | 26 |
| 2.5 | 1/4 | 546 | 62 | 28 |
| 2.75 | 1/8 | 534 | 75 | 43 |

Example 4

A non-flowing benzene soluble siloxane polymer having the composition 3.5 mol per cent phenylmethylsiloxane and 96.5 mol per cent dimethylsiloxane was compounded with 30 parts by weight of a silica aerogel and with the various organic peroxides and $ZnO_2$ shown below. For comparison a sample containing no $ZnO_2$ is included.

| Parts by wt. Vulcanizing Agent | Parts by wt. $ZnO_2$ | Tensile, p. s. i. | Percent Elongation at break | Percent Compression set |
|---|---|---|---|---|
| 2.25 t-butyl perbenzoate | 0 | 665 | 336 | 56 |
| 2.25 t-butyl perbenzoate | 1/4 | 677 | 225 | 31 |
| 1.5 t-butyl perbenzoate and .25 benzoyl peroxide | 1/2 | 607 | 232 | 39 |

Example 5

100 parts by weight of a non-tacky benzene soluble dimethylpolysiloxane, 40 parts of a fume silica, 1.5 parts benzoyl peroxide and 0.5 parts zinc oxide were milled until a uniform mix was obtained and then heated 5 minutes at 125° C. and finally cured 24 hours at 250° C. The resulting elastomer had a tensile strength of 855 p. s. i., an elongation at break of 255 per cent, a durometer reading of 62 and a compression set of 31 per cent. The same composition without the zinc oxide had a tensile strength of 887 p. s. i., an elongation of 297 per cent, a durometer reading of 56 and a compression set of 68 per cent.

Example 6

The experiment of Example 5 was repeated except that 1.5 parts of p-chlorobenzoyl peroxide was employed as the vulcanizing agent and 6 parts zinc oxide were used. The resulting elastomer had a tensile of 775 p. s. i., an elongation at break of 260 per cent, a durometer of 69 and a compression set of 22.5 per cent.

That which is claimed is:

1. A composition of matter composed of a diorganopolysiloxane of at least 5000 cs. viscosity at 250 C., a silica filler, an organic peroxide vulcanizing agent and from 1/16 to 10 parts by weight based upon 100 parts by weight siloxane of an additive selected from the group consisting of zinc oxide and zinc peroxide said siloxane having from 1.9 to 2 organic radicals per silicon atom said radicals being selected from the group consisting of alkyl, phenyl and siliconeopentyl radicals, at least 50 per cent of the total number of radicals being alkyl.

2. A siloxane elastomer which has been vulcanized with an organic peroxide vulcanizing agent, said elastomer being composed of a polymeric organosiloxane having from 1.9 to 2 organic radicals per silicon atom said radicals being selected from the group consisting of alkyl, phenyl and siliconeopentyl radicals at least 50 per cent of said radicals being alkyl, a silica filler and from 1/16 to 10 parts by weight based upon 100 parts by weight of the siloxane of an additive selected from the group consisting of zinc oxide and zinc peroxide.

3. An elastomer in accordance with claim 2 in which the siloxane is a methylphenylsiloxane.

4. An elastomer in accordance with claim 2 in which the siloxane is a siliconeopentylmethylsiloxane.

5. An elastomer in accordance with claim 2 in which the siloxane is a methylsiloxane.

References Cited in the file of this patent

UNITED STATES PATENTS

| | | |
|---|---|---|
| 2,460,795 | Warrick | Feb. 1, 1949 |
| 2,507,519 | Goodwin | May 16, 1950 |
| 2,521,528 | Marsden | Sept. 5, 1950 |
| 2,560,498 | Warrick | July 10, 1951 |
| 2,608,545 | Warrick | Aug. 26, 1952 |
| 2,671,069 | Savage | Mar. 2, 1954 |

OTHER REFERENCES

Sturgis et al.: Ind. Eng. Chem., vol. 39, pages 64 to 68, 1947.